United States Patent
Wang et al.

(10) Patent No.: US 9,485,131 B2
(45) Date of Patent: Nov. 1, 2016

(54) MULTILAYER NETWORK CONNECTION COMMUNICATION SYSTEM, SMART TERMINAL DEVICE, AND COMMUNICATION METHOD THERETO

(71) Applicant: Industrial Technology Research Institute, Hsinchu (TW)

(72) Inventors: Jui-Tang Wang, Keelung (TW); Ting-Chen Song, Hsinchu County (TW)

(73) Assignee: Industrial Technology Research Institute, Hsinchu (TW)

(*) Notice: Subject to any disclaimer, the term of this patent is extended or adjusted under 35 U.S.C. 154(b) by 84 days.

(21) Appl. No.: 13/962,968

(22) Filed: Aug. 9, 2013

(65) Prior Publication Data

US 2014/0047008 A1  Feb. 13, 2014

Related U.S. Application Data

(60) Provisional application No. 61/681,640, filed on Aug. 10, 2012.

(30) Foreign Application Priority Data

Jul. 19, 2013 (TW) .............................. 102126001 A

(51) Int. Cl.
*H04L 29/06* (2006.01)
*H04L 29/08* (2006.01)
(Continued)

(52) U.S. Cl.
CPC ......... *H04L 29/06047* (2013.01); *H04L 67/16* (2013.01); *H04W 4/008* (2013.01); *H04W 4/18* (2013.01); *H04L 67/2814* (2013.01); *H04L 69/18* (2013.01)

(58) Field of Classification Search
CPC ............. H04L 29/08072; H04L 29/06; H04L 29/0809

USPC ........................................................ 709/203
See application file for complete search history.

(56) References Cited

U.S. PATENT DOCUMENTS 8,260,266 B1    9/2012  Amidon et al.
2005/0079817 A1*  4/2005  Kotola et al. ................ 455/41.2
(Continued)

FOREIGN PATENT DOCUMENTS

CN       1894926        1/2007
JP     2003051772       2/2003
(Continued)

OTHER PUBLICATIONS

"Notice of Allowance of Japan Counterpart Application", issued on Aug. 19, 2014, p. 1-p. 3.
(Continued)

*Primary Examiner* — Nicholas Taylor
*Assistant Examiner* — Chong G Kim
(74) *Attorney, Agent, or Firm* — Jianq Chyun IP Office

(57) ABSTRACT

A multilayer network connection communication system includes a mobile device, a smart terminal device, a service server, a first layer network, and a second layer network. The mobile device sends at least one inquiry message through the first layer network to inquire the smart terminal device whether the smart terminal device supports at least one first application. Among the at least one first application, the smart terminal device supports at least one second application including a third application. The smart terminal device requests the mobile device through the first layer network to start up the at least one second application, where the third application is started up to respond to the at least one startup message. The smart terminal device receives a user data from the mobile device through the first layer network and transmits the user data to the service server through the second layer network.

34 Claims, 7 Drawing Sheets

(51) Int. Cl.
*H04W 4/00* (2009.01)
*H04W 4/18* (2009.01)

(56) References Cited

U.S. PATENT DOCUMENTS

| | | | |
|---|---|---|---|
| 2005/0082367 A1* | 4/2005 | Jalkanen et al. | 235/451 |
| 2007/0136130 A1* | 6/2007 | Liu | G06Q 30/02 705/14.51 |
| 2009/0170432 A1* | 7/2009 | Lortz | G06F 8/61 455/41.1 |
| 2009/0298426 A1* | 12/2009 | Helvick | G06Q 10/109 455/41.1 |
| 2010/0257239 A1* | 10/2010 | Roberts | G06Q 10/10 709/204 |
| 2012/0029990 A1* | 2/2012 | Fisher | G06Q 20/105 705/14.19 |
| 2012/0150601 A1* | 6/2012 | Fisher | 705/14.23 |
| 2012/0228374 A1* | 9/2012 | Jalkanen | G06Q 20/203 235/375 |
| 2012/0236820 A1 | 9/2012 | Park et al. | |
| 2012/0252418 A1* | 10/2012 | Kandekar | H04W 4/021 455/414.1 |
| 2012/0329388 A1* | 12/2012 | Royston | H04W 4/008 455/41.1 |
| 2013/0138492 A1* | 5/2013 | Delgado | G06Q 30/02 705/14.25 |
| 2013/0185137 A1* | 7/2013 | Shafi | G06Q 30/0207 705/14.35 |

FOREIGN PATENT DOCUMENTS

| | | |
|---|---|---|
| JP | 2003258808 | 9/2003 |
| JP | 2007328624 | 12/2007 |
| JP | 2010219824 | 9/2010 |
| TW | M431379 | 6/2012 |
| WO | 03052960 | 6/2003 |
| WO | 03081787 | 10/2003 |
| WO | 2005038678 | 4/2005 |
| WO | 2010017501 | 2/2010 |

OTHER PUBLICATIONS

"Office Action of European Counterpart Application", issued on Dec. 5, 2013, p. 1-p. 7.

Siira et al., "The impact of NFC on multimodal social media application," Second International Workshop on Near Field Communication, Apr. 20, 2010, pp. 51-56.

Kneibl et al., "All-I-Touch as Combination of NFC and Lifestyle," First International Workshop on Near Field Communication, Feb. 24, 2009, pp. 51-55.

Fressancourt et al., "NFCSocial: social networking in mobility through IMS and NFC," First International Workshop on Near Field Communication, Feb. 24, 2009, pp. 24-29.

Kalofonos et al., "MyNet: a Platform for Secure P2P Personal and Social Networking Services," Sixth Annual IEEE International Conference on Pervasive Computing and Communications, Mar. 17, 2008, pp. 135-146.

Zhong et al., "Less effortful thinking leads to more social networking? The associations between the use of social network sites and personality traits," Computers in Human Behavior May 27, 2011, pp. 1265-1271.

Jaffery et al., "NFC Awards: Commentary and Agenda," Pakistan Economic and Social Review 44 (2), Dec. 2006, pp. 209-234.

"Office Action of Taiwan Counterpart Application", issued on Mar. 30, 2015, p. 1-p. 8.

"Office Action of Chinese Counterpart Application", issued on Jan. 4, 2016, p. 1-p. 7.

* cited by examiner

MULTILAYER NETWORK CONNECTION COMMUNICATION SYSTEM, SMART TERMINAL DEVICE, AND COMMUNICATION METHOD THERETO

CROSS-REFERENCE TO RELATED APPLICATION

This application claims the priority benefits of U.S. provisional application Ser. No. 61/681,640, filed on Aug. 10, 2012 and Taiwan application serial no. 102126001, filed on Jul. 19, 2013. The entirety of each of the above-mentioned patent applications is hereby incorporated by reference herein and made a part of this specification.

BACKGROUND

1. Technical Field

The disclosure relates to a multilayer network connection communication system, a smart terminal device and a communication method thereto.

2. Description of Related Art

With high Internet usage rate of smart phones, users can now interact and share information with each other on social network websites or via Email anytime and anywhere. A user can share a latest status and location of his/her own with friends in a manner of check-in while being informed of the same of friends, so as to share pleasures in life. In addition, shops nowadays also provide the user with discounts in the manner of check-in, and information can also be shared to the social network websites so as to achieve an effect of promotion to the shops.

However, when the user intends to check-in or transceive Email, the Internet may not be available due to reasons including: the user not being a member of a 3G unlimited data plan, net surfing not being turned on due to expansive cost overseas, or Wi-Fi connectivity not being available. Furthermore, when the user intends to check-in or search discounts of neighboring shops, it is quite often that desired data cannot be found due to language barrier.

SUMMARY

The disclosure is directed to a multilayer network connection communication system, a smart terminal device and a communication method thereto, which are capable of providing a user with Internet service temporarily.

The disclosure provides a multilayer network connection communication system including a mobile device, a smart terminal device, a service server, a first layer network, and a second layer network. A first connection between the mobile device and the smart terminal device is established through a first layer network; and a second connection between the smart terminal device and the service server is established through a second layer network. The mobile device sends at least one inquiry message to inquire whether the smart terminal device supports at least one first application. The smart terminal device receives the inquiry message, and checks whether the at least one first application is supported according to the inquiry message. Therein, the smart terminal device is capable of supporting at least one second application among the at least one first application, and the at least one second application includes a third application. The smart terminal device sends at least one startup message to request the mobile device to start up the at least one second application, where the third application is started up to respond to the at least one startup message. The smart terminal device receives a user data sent by the third application from the mobile device through the first layer network and transmits the user data sent by the third application to the service server through the second layer network.

The disclosure provides a smart terminal device which includes a first network module, an application supporting module, a message transceiving module and a second network module. The first network module detects a mobile device through a first layer network and establishes a first connection with the mobile device through the first layer network. The message transceiving module sends at least one inquiry message and the at least one inquiry message inquires whether the smart terminal device supports at least one first application. The application supporting module checks whether the first application is supported according to the at least one inquiry message, in which the smart terminal device is capable of supporting at least one second application among the at least one first application, and the at least one second application includes a third application. The message transceiving module sends at least one startup message to request the mobile device to start up the at least one second application, in which the third application is started up to respond to the at least one startup message. The message transceiving module receives a user data sent by the third application from the mobile device through the first layer network. The second network module establishes a second connection through a second layer network, and transmits the user data sent by the third application to a service server through the second layer network.

The disclosure provides a multilayer network connection communication method which includes the following steps. First, a first connection is established between a mobile device and a smart terminal device through a first layer network. The mobile device sends at least one inquiry message to inquire whether the smart terminal device supports at least one first application. The smart terminal device receives the at least one inquiry message, and checks whether the at least one first application is supported according to the at least one inquiry message, in which the smart terminal device is capable of supporting at least one second application among the at least one first application, and the at least one second application includes a third application. The smart terminal device sends at least one startup message to request the mobile device to start up the at least one second application, in which the third application is started up to respond to the at least one startup message. The smart terminal device receives a user data sent by the third application from the mobile device through the first layer network. Next, a second connection between the smart terminal device and the service server is established through the second layer network, and the smart terminal device transmits the user data sent by the third application to the service server through the second layer network.

The disclosure provides a multilayer network connection communication method which includes the following steps. First, a mobile device is detected through a first layer network. Next, a first connection with the mobile device is established through the first layer network and at least one inquiry message is received from the mobile device, in which the at least one inquiry message inquires whether at least one first application is supported. Afterwards, whether the at least one first application is supported is checked, and at least one startup message is transmitted to request the mobile device to start up the at least one second application, in which the third application is started up to respond to the startup message. Next, a user data sent by the third application is received from the mobile device through the first layer network. A second connection is established through a second layer network, and the user data sent by the third application is transmitted to a service server through the second layer network.

Based on above, the network architecture of two-layers is configured in the multilayer network connection communication system, the smart terminal device and the communication method thereto, so that the smart terminal device can request the mobile device to start up the supported application through the first layer network. The mobile device can transmit the user data of the supported application to the smart terminal device through the first layer network. The smart terminal device can transmit the regional data together with the user data to the service server through the second layer network so as to perform the data update. Under the architecture of the multilayer network connection communication system, the mobile device of the user is without Internet service, the service server can still provide Internet service temporarily for the mobile device.

To make the above features and advantages of the present disclosure more comprehensible, several embodiments accompanied with drawings are described in detail as follows.

DETAILED DESCRIPTION

Figure 1:
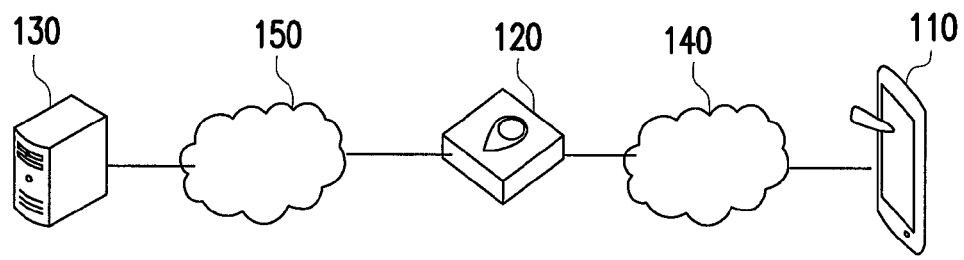
FIG. 1 illustrates a multilayer network connection communication system according to an exemplary embodiment of the disclosure.

FIG. 1 illustrates a multilayer network connection communication system according to an exemplary embodiment of the disclosure. However, FIG. 1 is merely illustrated for the convenience of the description, and the disclosure is not limited thereto.

Referring to FIG. 1, a multilayer network connection communication system 100 includes a mobile device 110, a smart terminal device 120, a service server 130, a first layer network 140, and a second layer network 150.

In the present exemplary embodiment, the mobile device 110 may be a smart phone having transmission functions such as infrared, bluetooth, near field communication, (NFC), device-to-device (D2D), and so on. In other embodiments, the mobile device may be a tablet computer, a personal digital assistant, a notebook computer or a digital camera, or the mobile device can also be smart cards such as a radio frequency identification card (RFID card), a Mifare card or a FeliCa card.

The service server 130 is an application server capable of providing an environment for executing applications. In the present exemplary embodiment, the application server can be, for example, application servers for providing G-mail electronic mailbox or social network websites such as Facebook and Twitter.

The smart terminal device 120 is configured to provide a multilayer network connection communication so that the mobile device 110 can connect to the service server 130 through a multilayer network connection.

For instance, besides wireless network connection such as WiMAX communication protocol, Wi-Fi communication protocol, 2 G communication protocol, 3 G communication protocol, or 4 G communication protocol, or wired network connections such as ADSL Broadband or fiber network, the smart terminal device 120 can also provide the transmission functions such as a near field communication connection of D2D.

The first layer network 140 is configured to connect the mobile device 110 with the smart terminal device 120. In other words, the smart terminal device 120 establishes a connection with the mobile device 110 through the first layer network 140. Hereinafter, the connection between the smart terminal device 120 and the mobile device 110 is referred to as a "first connection". In the present exemplary embodiment, the first connection is the near field communication connection, which means that the smart terminal device 120 may establish the first connection with the mobile device 110 through infrared, bluetooth, NFC or Wi-Fi Direct.

The second layer network 150 is configured to connect the smart terminal device 120 and the service server 130. In other words, the smart terminal device 120 establishes a connection with the service server 130 through the second layer network 150. Hereinafter, the connection between the smart terminal device 120 and the service server 130 is referred to as a "second connection". In the present exemplary embodiment, the second connection is a wireless network connection or a wired network connection, which means that the smart terminal device 120 can establish the second connection with the service server 130 through WiMAX communication protocol, Wi-Fi communication protocol, 2 G communication protocol, 3 G communication protocol, or 4 G communication protocol, ADSL Broadband or fiber network.

Under the architecture of the multilayer network connection communication system 100, the mobile device 110 without Internet service can still be connected to the service server 130 through the smart terminal device 120.

Figure 2:
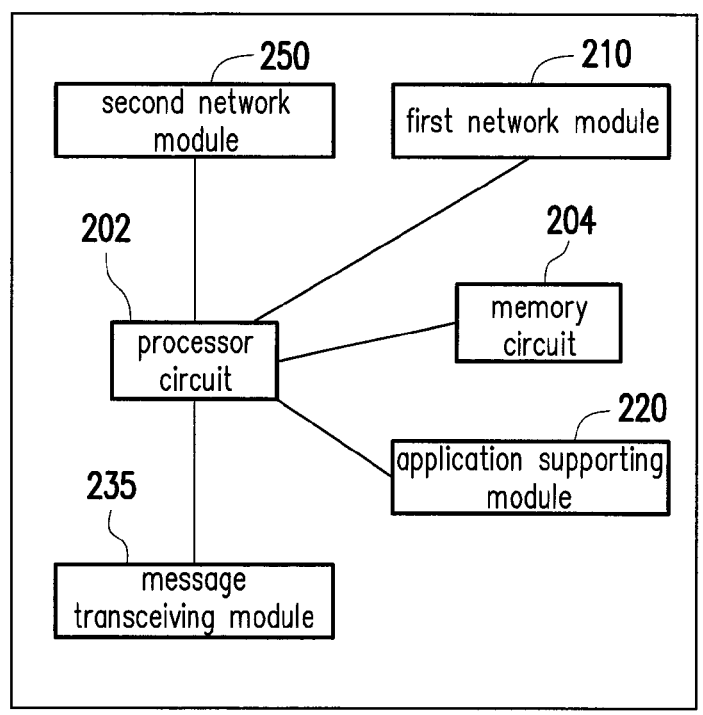
FIG. 2 is a schematic block diagram illustrating a smart terminal device according to an exemplary embodiment of the disclosure.

FIG. 2 is a schematic block diagram illustrating a smart terminal device according to an exemplary embodiment of the disclosure.

Referring to FIG. 1 and FIG. 2 together, the smart terminal device 120 includes a processor circuit 202, a memory circuit 204, a first network module 210, an application supporting module 220, a message transceiving module 235 and a second network module 250.

The processor circuit 202 is configured to control entire operations of the smart terminal device 120.

The memory circuit 204 is coupled to the processor circuit 202 for storing data. For instance, the memory circuit 204 is a flash ROM or other applicable storage devices.

The first network module 210 is coupled to the memory circuit 202 and configured to detect whether the mobile device 110 is within an range where the connection can be established. Further, in the present exemplary embodiment, the first network module 210 is further configured to establish the first connection with the mobile device 110 through the first layer network 140.

The application supporting module 220 is coupled to the processor circuit 202 and configured to support applications of the mobile device 110. For instance, the applications include a social network application, an Email application and so on.

The message transceiving module 235 is coupled to the processor circuit 202, and when the mobile device 110 sends an inquiry message to inquire whether at least one application (hereinafter, it refers to as a "first application") is supported by the smart terminal device 120, the message transceiving module 235 is configured to receive the inquiry message.

The application supporting module 220 is capable of checking whether the smart terminal device 120 supports the first application according to the inquiry message. Hereinafter, applications supported by the smart terminal device 120 among the at least one first application is referred to as a "second application".

In addition, the message transceiving module 235 is further configured to send a startup message to request the mobile device 110 to start up the at least one second application. The message transceiving module 235 is further configured to receive data from the applications in the mobile device 110. For instance, when a third application among the at least one second application is started up by the mobile device 110, the message transceiving module 235 receives the data sent by the third application from the mobile device 110 through the first layer network 140. In the present exemplary embodiment, the data sent by the third application from the mobile device 110 is referred to as a "user data".

In the present exemplary embodiment, the first network module 210, the application supporting module 220, the message transceiving module 235 and the second network module 250 are implemented by using hardware apparatuses composed of logic circuit components. However, the disclosure is not limited thereto. In another exemplary embodiment, functions executed by the first network module 210, the application supporting module 220, the message transceiving module 235 and the second network module 250 can also be implemented in program codes. For instance, the program codes for implementing the functions of the first network module 210, the application supporting module 220, the message transceiving module 235 and the second network module 250 are stored in the memory circuit 204, so that when the smart terminal device 120 is powered on, the program codes can be executed by the processor circuit 202.

Particularly, in the present exemplary embodiment, the smart terminal device 120 can establish the second connection with the service server 130 by the second network module 250 through the second layer network 150, and the user data received from the application of the mobile device 110 is transmitted to the service server 130. Different conditions in use under the architecture of the multilayer network connection communication system 100 are discussed in the following exemplary embodiments.

Figure 3:
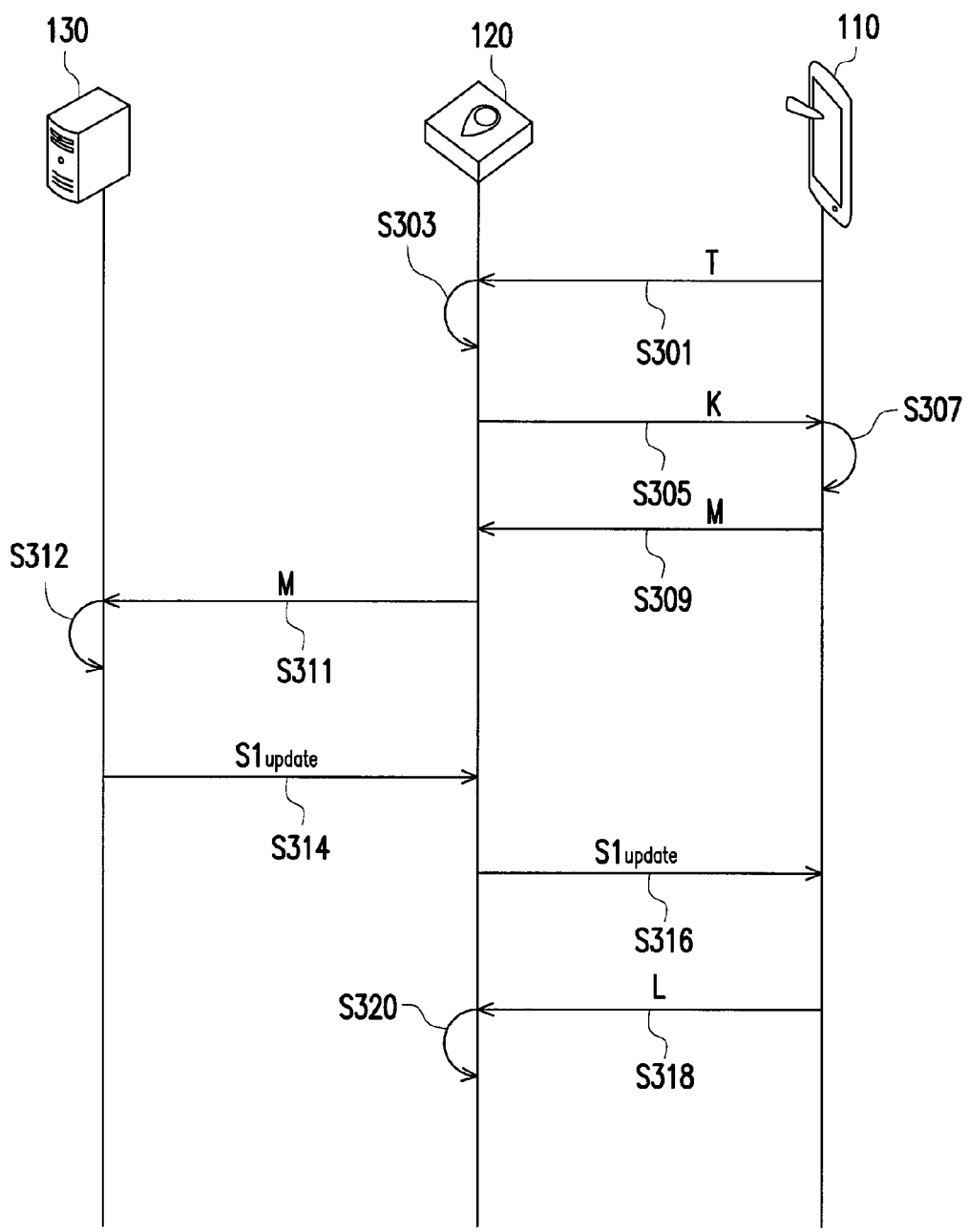
FIG. 3 is a schematic diagram illustrating data flows of a multilayer network connection communication method according to first exemplary embodiment of the disclosure.

FIG. 3 is a schematic diagram illustrating data flows of a multilayer network connection communication method according to first exemplary embodiment of the disclosure.

In the present exemplary embodiment, in case the mobile device 110 of a user is without Internet service, the data can be sent or received through the smart terminal device 120.

Referring FIG. 3, when the user intends to send or receive Email, the mobile device 110 can be moved to approach the smart terminal device 120 so as to establish the first connection with the first network module 210 of the smart terminal device 120 through the first layer network 110, and an inquiry message T is sent to inquire whether the smart terminal device 120 supports the application for the user to send or receive Email (data flow S301). In this case, the application supporting module 220 of the smart terminal device 120 checks whether the application for transceiving Email is supported, so as to respond to the inquiry message T (data flow S303). If the smart terminal device 120 can support the application for transceiving Email, the message transceiving module 235 of the smart terminal device 120 then sends a startup message K to request the mobile device 110 to start up said application (data flow S305). Subsequently, the mobile device 110 starts up the application in response to the startup message K (data flow S307).

For instance, the application for transceiving Email can be, for example, a G-mail application. When the mobile device 110 establishes the first connection with the smart terminal device 120, the mobile device 110 sends the inquiry message T corresponding to the G-mail application to inquire whether the smart terminal device 120 supports the G-mail application. If the smart terminal device 120 supports the G-mail application, the message transceiving module 235 of the smart terminal device 120 then sends the startup message K corresponding to the G-mail application to the mobile device 110. In addition, when the user intends to use different applications by utilizing the mobile device 110, the inquiry message T may also be sent to the smart terminal device 120 in one list. Similarly, when the smart terminal device 120 supports the applications in the list, the startup message K may also be sent together in one list by the smart terminal device 120 to the mobile device 110.

When the mobile device 110 responds the startup message K to the smart terminal device 120, the message transceiving module 235 of the smart terminal device 120 receives a user data M sent by the mobile device 110 through the first layer network 140 (data flow S309). For instance, when being started up, the G-mail application can request the user to enter a user account and a user password for G-mail, and the user data M includes the user account and the user password for G-mail or an Email pending for transmission.

When the user data M is received by the smart terminal device 120 from the mobile device 110, the second network module 250 of the smart terminal device 120 may establish the second connection with the service server 130 through the second layer network 150, so as to transmit the user data M to the service server 130 (data flow S311). Herein, the second network module 250 of the smart terminal device 120 may utilize the user account and the user password for G-mail in the user data M, so as to login an application server of G-mail through the wireless network connection or the wired network connection. After the application server of G-mail completes an account verification procedure according to the user account and the user password for G-mail, the Email pending for transmission in the user data M then is transmitted (data flow S312).

In the present exemplary embodiment, the smart terminal device 120 further includes a data updating module (not illustrated). Once the user data M is transmitted to the service server 130, the data updating module of the smart terminal device 120 may receive a status update information S1$_{update}$ from the service server 130 through the second network module 250 (data flow S314), and the status update information S1$_{update}$ date is then transmitted to the mobile device 110 through the first network module 210 (data flow S316), so as to complete a data synchronization update. In other words, the mobile device 110 can transmit the data corresponding to the application to the corresponding application server through the smart terminal device 120 while receiving new message corresponding to the application from the corresponding application server through the smart terminal device 120. For instance, the mobile device 110 can send Email through the smart terminal device 120 while receiving a new Email through the smart terminal device 120. As another example, the mobile device 110 can transmit a message to a social network server through the smart terminal device 120 while receiving a new message on the social network server through the smart terminal device 120.

When the data synchronization update is completed by the mobile device 110, the mobile device 110 departs from the first layer network 150. For instance, in the present exemplary embodiment, the first network module 210 of the smart terminal device 120 can further receive an offline message L from the mobile device 110 (data flow S318), and the near field communication connection established with the mobile device 110 is ceased (data flow S320) in response to the offline message L. Afterwards, the smart terminal device 120 may continue to detect whether there are other mobile devices establishing the near field communication connection through the first layer network 140.

In another exemplary embodiment, after the user moves the mobile device 110 to approach the smart terminal device 120 for establishing the first connection with the smart terminal device 120, the smart terminal device 120 may perform an authentication procedure or a payment procedure to the mobile device 110. More specifically, the smart terminal device 120 further includes an identification module (not illustrated), which can be used by the user to perform the authentication procedure or the payment procedure online with a provider of the smart terminal device 120 through the second network module 250 according to an identification code of the mobile device 110. In the present exemplary embodiment, the identification code of the mobile device 110 may be, for example, a subscriber identity module (SIM) card number of a smart phone served as an identification of the mobile device 110. The payment procedure can be mechanisms including a prepaid mechanism, a monthly payment mechanism or a payment-per-use mechanism.

Take the prepaid mechanism as an example, after the user move the mobile device 110 to approach the smart terminal device 120 for establishing the first connection with the smart terminal device 120, the smart terminal device 120 may perform the authentication procedure online according to the SIM card number of the mobile device 110 and confirm whether an amount of prepaid money is sufficient in said number. If the amount of prepaid money is sufficient, the smart terminal device 120 can continue to detect the application of the mobile device 110 for subsequent processes. If the amount of prepaid money is insufficient, the smart terminal device 120 may transmit a related message to remind the user, or even prompt the user to enter a credit card number in a browser displayed on the mobile device 110, so as to perform a prepaying process. For the monthly payment mechanism, the smart terminal device 120 may record usage times and places of the mobile device 110 online, so that the provider can mail a bill monthly to the user, accordingly.

Figure 4:
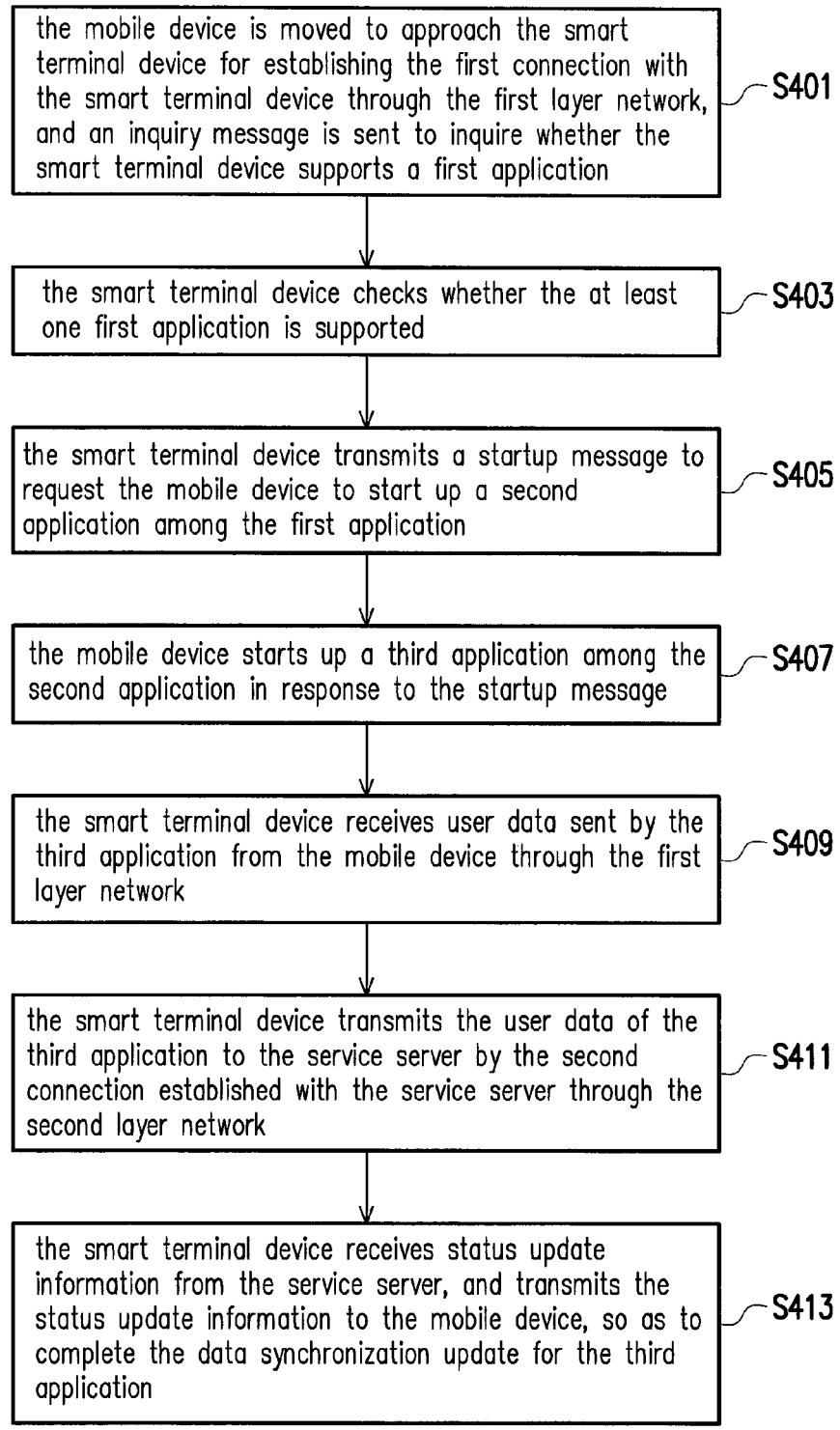
FIG. 4 is a flowchart illustrating a multilayer network connection communication method according to first exemplary embodiment of the disclosure.

FIG. 4 is a flowchart illustrating a multilayer network connection communication method according to first exemplary embodiment of the disclosure.

Referring to FIG. 4, in step S401, the user can move the mobile device 110 to approach the smart terminal device 120 for establishing the first connection with the smart terminal device 120 through the first layer network 140, and at least one inquiry message can be sent to inquire whether the smart terminal device 120 supports at least one first application. In step S403, the smart terminal device 120 checks whether the at least one first application is supported. In step S405, the smart terminal device 120 transmits a startup message to request the mobile device 110 to start up at least one second application among the at least one first application. In step S407, the mobile device 110 starts up at least one application (hereinafter, the third application) among the at least one second application in response to the startup message. In step S409, the smart terminal device 120 receives a user data sent by the third application from the mobile device 110 through the first layer network 140. In step S411, the smart terminal device 120 transmits the user data of the third application to the service server 130 by the second connection established with the service server 130 through the second layer network 150. In step S413, the smart terminal device 120 receives status update information from the service server 130, and transmits the status update information to the mobile device 110, so as to complete the data synchronization update for the third application. Implementation to each step depicted in FIG. 4 are described in detail in FIG. 3, thus it is omitted hereinafter.

Figure 5:
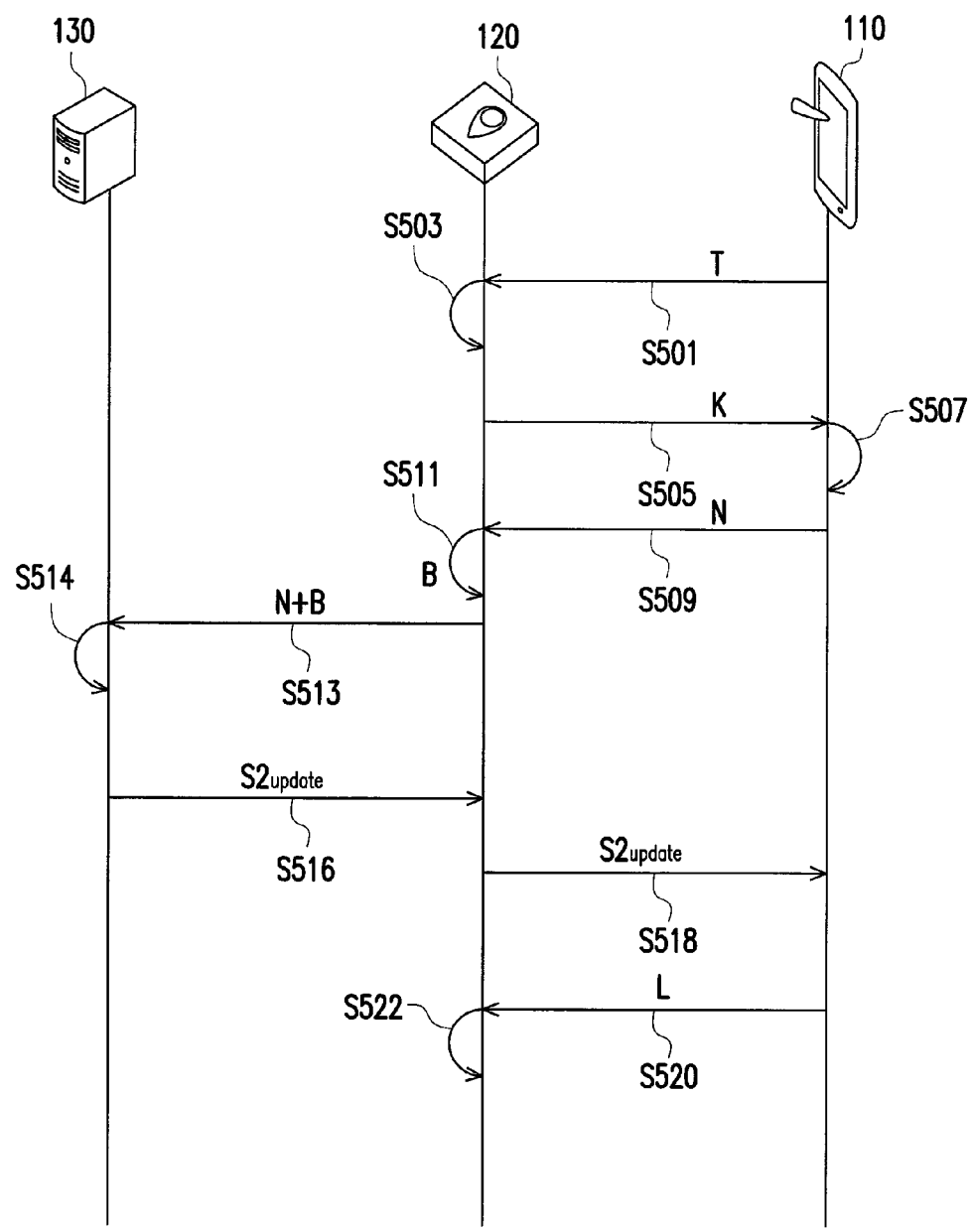
FIG. 5 is a schematic diagram illustrating data flows of a multilayer network connection communication method according to second exemplary embodiment of the disclosure.

FIG. 5 is a schematic diagram illustrating data flows of a multilayer network connection communication method according to second exemplary embodiment of the disclosure.

Referring to FIG. 5, the user can move the mobile device 110 to approach the smart terminal device 120 for establishing the first connection with the first network module 210 the smart terminal device 120 through the first layer network 140, and the inquiry message T can be sent to inquire whether the smart terminal device 120 supports the at least one first application (data flow S501). In an exemplary embodiment, the smart terminal device 120 may perform an authentication procedure or a payment procedure to the mobile device 110. Related description of above can refer to first explanation, thus it is omitted hereinafter.

Subsequently, the application supporting module 220 of the smart terminal device 120 checks whether the smart terminal device 120 supports the at least one application in response to the inquiry message T (data flow S503). The message transceiving module 235 of the smart terminal device 120 sends the startup message K to request the mobile device 110 to start up the at least one second application supported by the smart terminal device 120 among the at least one first application (data flow S505). Subsequently, the mobile device 110 can start up the third application among the at least one second application in response to the startup message K (data flow S507).

In the present exemplary embodiment, the application that the user of the mobile device 110 intended to use may be, for example, a Facebook application and a Twitter application. When the smart terminal device 120 establishes the first connection with the mobile device 110, whether the Facebook application and the Twitter application are supported by the smart terminal device 120 is also inquired. First, the application supporting module 220 of the smart terminal device 120 checks whether said two applications are supported. If yes, the message transceiving module 235 of the smart terminal device 120 also sends two of the startup messages K or one list which are corresponding to the Facebook application and the Twitter application, to the mobile device 110.

In addition, the user may start up the application before moving the mobile device 110 to approach the smart terminal device 120, so that a message or a picture can be input in advance. Herein, the message input in advance may be, an assessment to a shop A, persons who have visited the shop A, entitlement for viewing this message and so on. When the mobile device 110 responds the startup message to the smart terminal device 120, the message transceiving module 235 of the smart terminal device 120 receives a user data N of the application sent by the mobile device 110 through the first layer network 140 (data flow S509). For instance, in the present exemplary embodiment, the user data N is the user account and the user password of the user used in a social network service (e.g., Facebook), the message/the picture input in advance.

It should be noted that, in the present exemplary embodiment, the memory circuit 204 of the smart terminal device 120 can store regional service information. The regional information can be related information of the shop A including: a geographic coordinate system data and a corresponding address obtained via global positioning system (GPS), a name and a discount information of the shop A being manually input, or can be a weather information obtained via the Internet connection and information regarding other shops close to the shop A.

Accordingly, in the present exemplary embodiment, the smart terminal device 120 further includes a regional information module (not illustrated). When the user data is received by the smart terminal device 120 from the mobile device 110, the regional information module of the smart terminal device 120 first adds the user data N to a regional service information B stored in the memory circuit at an application layer of the smart terminal device 120 (data flow S511). Subsequently, the second network module 250 of the smart terminal device 120 can establish the second connection with the service server 130 through the second layer network 150, so as to transmit the user data N together with the regional service information B to the service server 130 (data flow S513). Herein, the second network module 250 of the smart terminal device 120 can utilize the user account and the user password for the social network service in the user data M to login an application server of the social network service through the wireless network connection or the wired network connection. After the application server of the social network service completes an account verification procedure according to the user account and the user password, the user is permitted to send a new status (e.g., check-in) (data flow S514). For instance, a content of check-in can be, for example, the name and the address of the shop A (the regional service information B) plus the assessment to the shop A, pictures uploaded by the user (the user data N). Since the regional service information B is an information preset by the smart terminal device 120, even if the shop A is located in other country, the smart terminal device 120 provided by the shop A can solve a problem of language barrier for the user in terms of check-in.

Furthermore, in the present exemplary embodiment, after the user data N and the regional service information B are transmitted to the service server 130, the data update module of the smart terminal device 120 may further receive a status update information $S2_{update}$ from the service server 130 (data flow S516), and the status update information $S2_{update}$ is transmitted to the mobile device 110 through the first network module 210 (data flow S518), so as to complete the data synchronization update. In other words, the mobile device 110 can update the status through the smart terminal device 120 while browsing an unread message or a latest status from friends since the social network application in the mobile device 110 has already completed the data synchronization update. When the mobile device 110 completes the data synchronization update of the social network application, the first network module 210 of the smart terminal device 120 receives an offline message L from the mobile device 110 (data flow S520), and the near field communication connection established with the mobile device 110 is ceased (data flow S522), so as to respond to the offline message L. Related description of above can refer to first explanation, thus it is omitted hereinafter.

Figure 6:
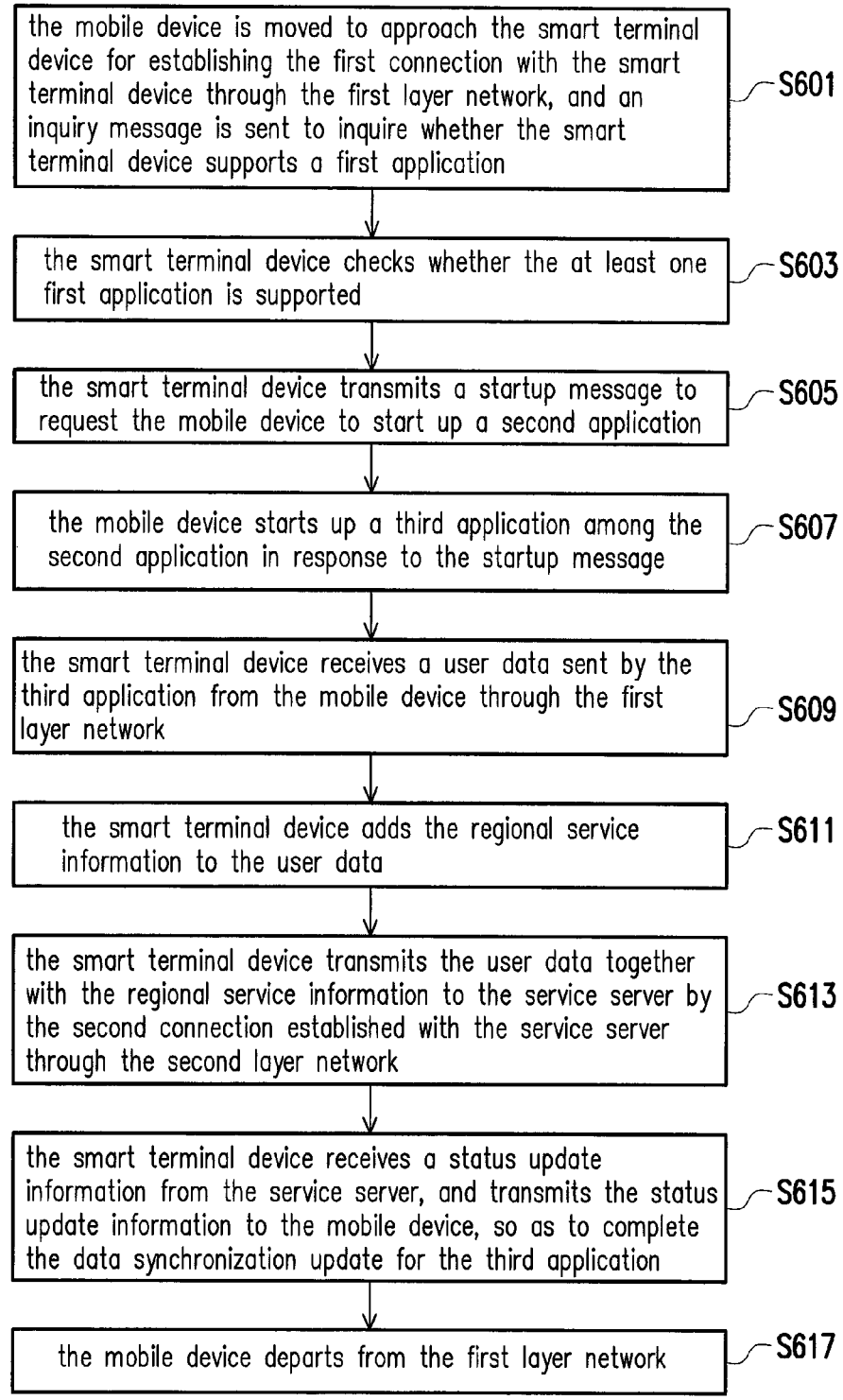
FIG. 6 is a flowchart illustrating a multilayer network connection communication method according to second exemplary embodiment of the disclosure.

FIG. 6 is a flowchart illustrating a multilayer network connection communication method according to second exemplary embodiment of the disclosure.

Referring to FIG. 6, in step S601, the user moves the mobile device 110 to approach the smart terminal device 120 for establishing the first connection with the smart terminal device 120 through the first layer network 140, and the inquiry message is sent to inquire whether the smart terminal device 120 supports at least one first application. In step S603, the smart terminal device 120 checks whether the at least one first application is supported. In case the smart terminal device 120 supports the at least one second application among the at least one first application, the smart terminal device 120 transmits at least one startup message to request the mobile device to start up at least one second application in step S605. In step S607, the mobile device 110 starts up at least one application (hereinafter, the third application) among the at least one second application to respond to the startup message. In step S609, the smart terminal device 120 receives a user data sent by the third application from the mobile device 110 through the first layer network 140. In step S611, the smart terminal device 120 adds the regional service information to the user data. In step S613, the smart terminal device 120 transmits the user data together with the regional service information to the service server 130 by the second connection established with the service server 130 through the second layer network 150. In step S615, the smart terminal device 120 receives status update information from the service server 130, and transmits the status update information to the mobile device 110, so as to complete the data synchronization update for the third application. Lastly, in step S617, the mobile device 110 departs from the first layer network 140. Implementation to each step depicted in FIG. 6 are described in detail in FIG. 5, thus it is omitted hereinafter.

Figure 7:
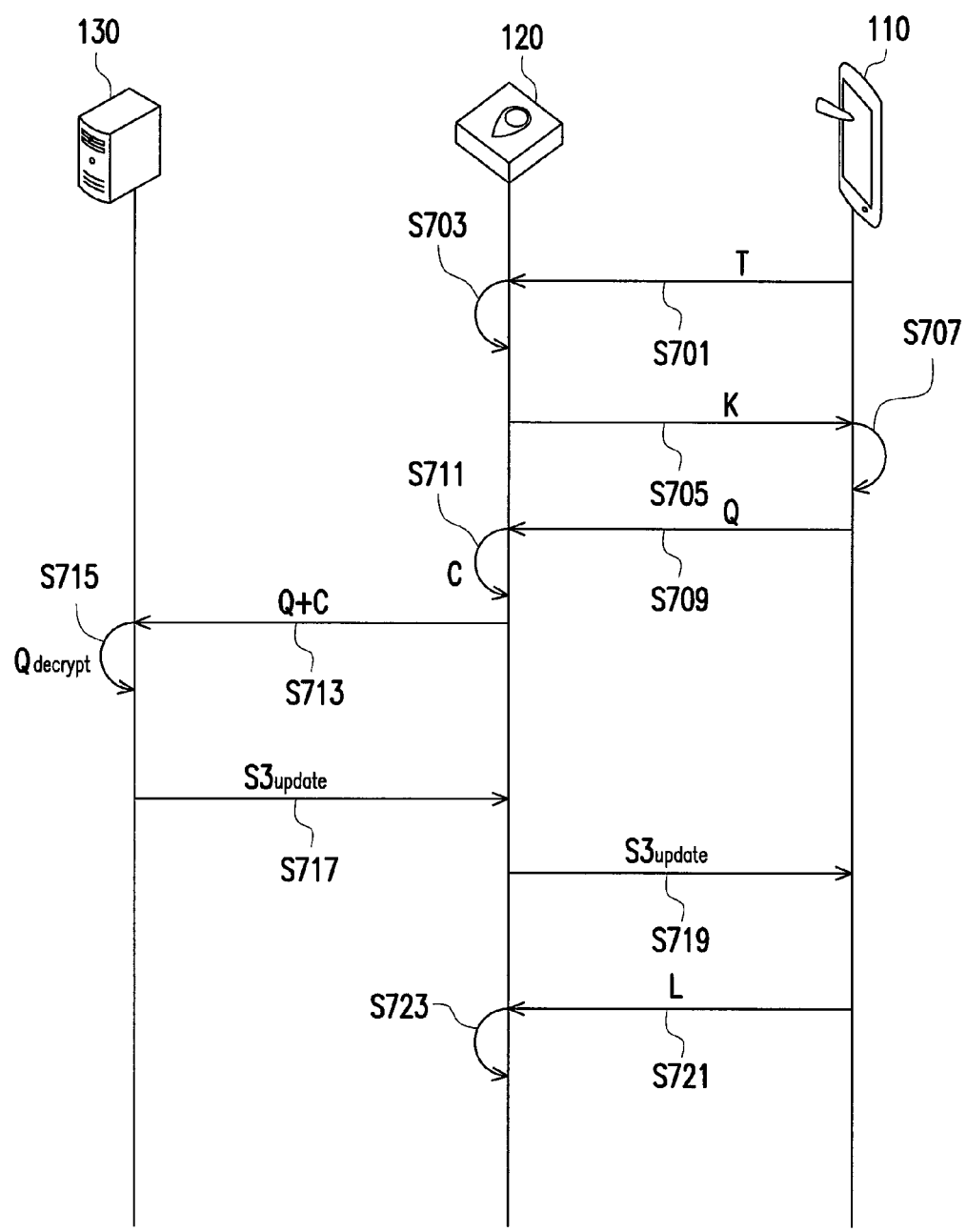
FIG. 7 is a schematic diagram illustrating data flows of a multilayer network connection communication method according to third exemplary embodiment of the disclosure.

In order to ensure confidentiality of information transmission in the multilayer network connection communication provided by the smart terminal device 120 of the shop, the mobile device 110 can protect user privacy by utilizing a cryptography technology to prevent the user data from being stolen or improper manipulation. FIG. 7 is a schematic diagram illustrating data flows of a multilayer network connection communication method according to third exemplary embodiment of the disclosure.

Referring to FIG. 7, the user can move the mobile device 110 to approach the smart terminal device 120 for establishing the first connection with the first network module 210 of the smart terminal device 120 through the first layer network 140, and the inquiry message T for the at least one first application can be sent to inquire whether the smart terminal device 120 supports the at least one first application (data flow S701). In an exemplary embodiment, the smart terminal device 120 can perform an authentication procedure or a payment procedure to the mobile device 110. It should be noted that, since the authentication procedure and the payment procedure involve a SIM card number of the smart phone and the credit card number of the user, in the present exemplary embodiment, the smart terminal device 120 can provide a security measure for Internet payments. For instance, the smart terminal device 120 can adopt a common cryptographic technology of 128-bit SSL (secure sockets layer), or a cryptographic technology with higher security such as SET (secure electronic transaction), so as to provide an encryption between the mobile device 110 and the provider of the smart terminal device 120, thereby ensuring the security for data transmission in the authentication procedure and the payment procedure.

Subsequently, the application supporting module 220 of the smart terminal device 120 may check whether the at least one application is supported, so as to respond to the inquiry message T (data flow S703). If the smart terminal device 120 supports the at least one second application among the at least one first application, the message transceiving module 235 of the smart terminal device 120 then sends a startup message to request the mobile device 110 to start up the at least one second application (data flow S705).

Subsequently, the mobile device 110 starts up a third application among the at least one second application in response to the startup message. Particularly, in the present exemplary embodiment, when the mobile device 110 starts up the application, first, the mobile device 110 checks whether a pending data is stored, and the pending data can be, for example, the message/the picture input in advance, and the Email pending for transmission. When the mobile device 110 is stored with the pending data, the mobile device 110 encrypts the pending data (data flow S711). Hereinafter, the pending data being encrypted is referred to as "user data Q". The mobile device 110 may process the pending data by calling an encrypt program through an application interface (API). The encrypt program may be, for example, a symmetric encryption with faster processing speed such as a DES (data encryption standard) encryption algorithm, or an asymmetric encryption with higher security and widely used by electronic business, such as a RSA (Ron Rivest, Adi Shamir, and Leonard Adleman) encryption algorithm. In the RSA encryption algorithm, a secure hash algorithm (SHA) and a Message-Digest Algorithm 5 (MD5) using one-way hash function combining private key for encryption are of two most used encryption algorithms for ensuring integrity of message transmission.

After the mobile device 110 encrypts the pending data to generate the user data Q, the message transceiving module 235 of the smart terminal device 120 receives the user data Q sent by the mobile device 110 through the first layer network 140 (data flow S709). When the user data is received by the smart terminal device 120 from the mobile device 110, the regional information module first adds the user data Q to regional service information C stored in the memory circuit at an application layer of the smart terminal device 120 (data flow S711). Subsequently, the second network module 250 of the smart terminal device 120 may establish the second connection with the service server 130 through the second layer network 150, so as to transmit the user data Q together with the regional service information C to the service server 130 (data flow S713).

The user data Q is decrypted after being received by the service server 130, and a data update is performed according to the user data $Q_{decrypt}$ (data flow S715). Take the MD5 algorithm as an example, the decryption can be performed by utilizing the one-way hash function combining a public key to ensure integrity and confidentiality of the data, so as prevent the data from manipulation during the transmission.

After the user data Q and the regional service information C are transmitted to the service server 130, the data update module of the smart terminal device 120 may further receive status update information $S3_{update}$ from the service server 130 (data flow S717), and the status update information $S3_{update}$ is transmitted to the mobile device 110 through the first network module 210 (data flow S719), so as to complete the data synchronization update. Moreover, when the mobile device 110 completes the data synchronization update, the first network module 210 of the smart terminal device 120 can receive an offline message L from the mobile device 110 (data flow S721), and the near field communication connection established with the mobile device 110 is ceased (data flow S723) in response to the offline message L. Related description of above can refer to second explanation, thus it is omitted hereinafter.

On the other hand, after the mobile device 110 starts up the third application, if it is checked that the pending data is not stored in the mobile device 110, related processes regarding the encryption and the decryption can be omitted, and the user can then browse an unread message or a latest status from friends.

In an exemplary embodiment, in consideration of security issues, when the application is started up, the mobile device 110 may prompt the user to enter the user account and the user password corresponding to such application with protection of the 128-bit SSL cryptographic technology or the SET cryptographic technology, so as to login the service server 130 to complete the subsequent account verification procedure. In addition, the provider of the smart terminal device 120 can send a notification to other mobile devices of the user each time the mobile device 110 is in use, and the notification can include usage times and places of the mobile device 110, such that the mobile device 110 can be easily tracked in case of being stolen.

Figure 8:
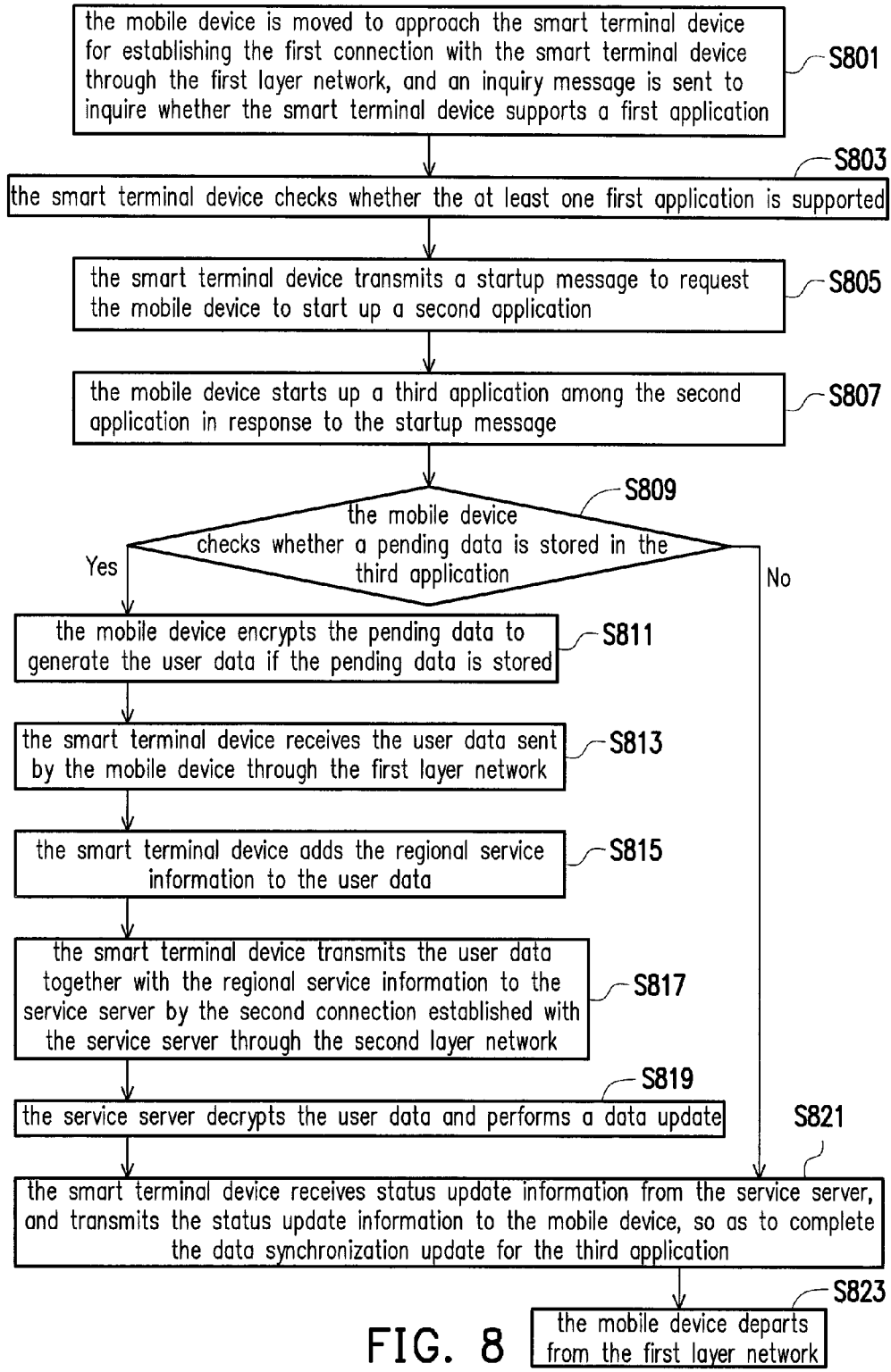
FIG. 8 is a flowchart illustrating a multilayer network connection communication method according to third exemplary embodiment of the disclosure.

FIG. 8 is a schematic diagram illustrating data flows of a multilayer network connection communication method according to third exemplary embodiment of the disclosure.

Referring to FIG. 8, in step S801, the user can move the mobile device 110 to approach the smart terminal device 120 for establishing the first connection with the smart terminal device 120 through the first layer network 140, and the inquiry message is sent to inquire whether the smart terminal device 120 supports at least one first application. In step S803, the smart terminal device 120 checks whether the at least one first application is supported. In case the smart terminal device 120 is capable of supporting the at least one second application among the at least one first application, the smart terminal device 120 transmits the startup message to request the mobile device 110 to start up the at least one second application in step S805. In step S807, the mobile device 110 starts up at least one application (hereinafter, the third application) among the at least one second application to respond to the startup message. In step S809, the mobile device 110 checks whether pending data is stored in the third application. In step S811, the mobile device 110 encrypts the pending data to generate the user data if the pending data is stored. In step S813, the smart terminal device 120 receives the user data sent by the mobile device 110 through the first layer network 140. In step S815, the smart terminal device 120 adds the regional service information to the user data. In step S817, the smart terminal device 120 transmits the user data together with the regional service information to the service server 130 by the second connection established with the service server 130 through the second layer network 150. In step S819, the service server 130 decrypts the user data and performs a data update. In step S821, the smart terminal device 120 receives status update information from the service server 130, and transmits the status update information to the mobile device 110, so as to complete the data synchronization update for the third application. On the other hand, in step S809, if it is checked that the pending data is not stored in the mobile device 110, proceeding to step S821. In step S823, the mobile device 110 departs from the first layer network 140. Nevertheless, implementation to each step depicted in FIG. 8 are described in detail in FIG. 7, thus it is omitted hereinafter.

In summary, the disclosure proposes the multilayer network connection communication system, the smart terminal device and the communication method thereto. In the exemplary embodiment of the disclosure, a network architecture of two-layers is utilized so the smart terminal device can start up the application of the mobile device of the user. The application of the mobile device transmits the user data to the smart terminal device through the first layer network. After the preset regional data is optionally added by the smart terminal device, the regional data is transmitted together with the user data through the second layer network to the service server to perform the data update. Under such architecture, in cases that 3G Internet function not being provided, net surfing not being turned on due to expansive cost overseas, or even Wi-Fi connectivity not being available, the smart terminal device can still provide Internet service temporarily while providing a local service, so that the user can obtain related information such as advertisements or discounts. In addition, the mobile device can utilize the encryption mechanism to protect privacy of the user data during data transmission of the mobile device in the multilayer network connection communication system.

Although the present disclosure has been described with reference to the above embodiments, it is apparent to one of the ordinary skill in the art that modifications to the described embodiments may be made without departing from the spirit of the present disclosure. Accordingly, the scope of the present disclosure will be defined by the attached claims not by the above detailed descriptions.

What is claimed is:

1. A multilayer network connection communication system, comprising:
    a smart terminal device;
    a service server, which is an application server providing an environment for executing a specific application, wherein the specific application at least comprises at least one of a social network application and an Email application;
    a mobile device, accessing the service server through the smart terminal device, exchanging data of the specific application with the service server through the smart terminal device;
    a first layer network establishing a first connection between the mobile device and the smart terminal device with a technique of Wi-Fi Direct, wherein the mobile device bidirectionally communicates with the smart terminal device through the first connection; and
    a second layer network establishing a second connection between the smart terminal device and the service server, wherein
    the mobile device sends at least one inquiry message to the smart terminal device through the first connection to inquire whether the smart terminal device supports at least one first application,
    the smart terminal device receives the at least one inquiry message from the mobile device through the first connection, and checks whether the first application is supported according to the at least one inquiry message, wherein the smart terminal device and the mobile device both support at least one second application among the at least one first application, and the at least one second application includes the specific application,
    the smart terminal device sends at least one startup message directly to the mobile device through the first connection without using the service server to request the mobile device to execute the at least one second application of the mobile device, wherein the specific application of the mobile device is executed in response to the at least one startup message,
    after the operation of sending the at least one startup message directly to the mobile device through the first connection without using the service server, the smart terminal device receives the data of the specific application of the mobile device from the mobile device through the first layer network,
    after the operation of receiving the data of the specific application of the mobile device from the mobile device through the first layer network, the smart terminal device forwards the data of the specific application received from the mobile device through the first connection to the service server through the second layer network; and
    the smart terminal device forwards another data of the specific application directly to the mobile device through the first connection without using the service server only if the smart terminal device receives the another data of the specific application from the service server through the second connection.

2. The multilayer network connection communication system of claim 1, wherein the smart terminal device adds a regional service information to the data sent by the specific application, and the smart terminal device further transmits the data sent by the specific application together with the regional service information to the service server through the second layer network.

3. The multilayer network connection communication system of claim 1, the smart terminal device further performs an authentication procedure or a payment procedure according to an identification code of the mobile device.

4. The multilayer network connection communication system of claim 1, wherein the mobile device checks whether a pending data is stored, after the specific application is executed.

5. The multilayer network connection communication system of claim 4, wherein the mobile device encrypts the pending data to generate the data if the pending data is stored.

6. The multilayer network connection communication system of claim 1, after the data sent by the specific application is transmitted to the service server through the smart terminal device, the service server updates a status according to the data and sends a status update information to the smart terminal device, and the smart terminal device transmits the status update information to the mobile device.

7. The multilayer network connection communication system of claim 5, after the data sent by the specific application is transmitted to the service server, the service server decrypts the data, updates a status according to the data being decrypted, and sends a status update information to the smart terminal device, and the smart terminal device transmits the status update information to the mobile device.

8. The multilayer network connection communication system of claim 1, after the specific application is executed, the mobile device enters a user account and a user password corresponding to the specific application, wherein the data includes the user account and the user password, and the service server executes an account verification procedure according to the user account and the user password in the data.

9. The multilayer network connection communication system of claim 1, wherein the first connection includes a near field communication connection.

10. The multilayer network connection communication system of claim 1, wherein the second connection includes a wireless network connection or a wired network connection.

11. A smart terminal device, comprising:
a first network module detecting a mobile device through a first layer network and establishing a first connection with the mobile device through the first layer network with a technique of Wi-Fi Direct, wherein the mobile device bidirectionally communicates with the smart terminal device through the first connection;
an application supporting module;
a message transceiving module receiving at least one inquiry message from the mobile device through the first connection, wherein the at least one inquiry message inquires whether the smart terminal device supports at least one first application, the application supporting module checks whether the first application is supported according to the at least one inquiry message, the smart terminal device and the mobile device both support at least one second application among the at least one first application, and the at least one second application includes a specific application, the message transceiving module sends at least one startup message directly to the mobile device through the first connection without using a service server to request the mobile device to execute the at least one second application of the mobile device, the specific application of the mobile device is executed in response to the at least one startup message, after the operation of sending the at least one startup message directly to the mobile device through the first connection without using the service server, the message transceiving module receives data of the specific application of the mobile device from the mobile device through the first layer network; and
a second network module establishing a second connection through a second layer network, and after the operation of receiving the data of the specific application of the mobile device from the mobile device through the first layer network, the second network module forwards the data of the specific application received from the mobile device through the first connection to the service server through the second layer network, wherein the service server is an application server providing an environment for executing the specific application, wherein the specific application at least comprises at least one of a social network application and an Email application,
wherein the mobile device accesses the service server through the smart terminal device, exchanging the data of the specific application with the service server through the smart terminal device,
wherein the smart terminal device forwards another data of the specific application directly to the mobile device through the first connection without using the service server only if the smart terminal device receives the another data of the specific application from the service server through the second connection.

12. The smart terminal device of claim 11, wherein the second network module adds a regional service information to the data sent by the specific application, and transmits the data sent by the specific application together with the regional service information through the second layer network to the service server.

13. The smart terminal device of claim 11, further comprising:
an identification module performing an authentication procedure or a payment procedure according to an identification code of the mobile device.

14. The smart terminal device of claim 11, further comprising:
an information updating module receiving a status update information from the service server and transmitting the status update information to the mobile device, after the data sent by the specific application is transmitted to the service server.

15. The smart terminal device of claim 11, wherein the first network module receives an offline message from the mobile device, and suspends the first connection established by the mobile device in response to the offline message.

16. The smart terminal device of claim 11, wherein the first connection includes a near field communication connection.

17. The smart terminal device of claim 11, wherein the second connection includes a wireless network connection and a wired network connection.

18. A multilayer network connection communication method, comprising:
establishing a first connection between a mobile device and a smart terminal device through a first layer network with a technique of Wi-Fi Direct, wherein the mobile device bidirectionally communicates with the smart terminal device through the first connection;
sending at least one inquiry message, by the mobile device, to the smart terminal device through the first connection to inquire whether the smart terminal device supports at least one first application;
receiving the at least one inquiry message from the mobile device through the first connection, and checking whether the at least one first application is supported according to the at least one inquiry message, by the smart terminal device, wherein the smart terminal device and the mobile device both support at least one second application among the at least one first application, and the at least one second application includes a specific application,
sending at least one startup message, by the smart terminal device, directly to the mobile device through the first connection without using a service server to request the mobile device to execute the at least one second application of the mobile device, wherein the specific application of the mobile device is executed to respond to the at least one startup message;
after the step of sending the at least one startup message directly to the mobile device through the first connection without using the service server, receiving, by the smart terminal device, data of the specific application of the mobile device from the mobile device through the first layer network;

establishing, by a second layer network, a second connection between the smart terminal device and a service server, wherein the service server is an application server providing an environment for executing the specific application, wherein the specific application at least comprises at least one of a social network application and an Email application; and after the step of receiving the data of the specific application of the mobile device from the mobile device through the first layer network, transmitting, by the smart terminal device, the data of the specific application received from the mobile device through the first connection to the service server through the second layer network, wherein the mobile device accesses the service server through the smart terminal device, exchanging the data of the specific application with the service server through the smart terminal device; and forwarding, by the smart terminal device, another data of the specific application directly to the mobile device through the first connection without using the service server only if the smart terminal device receives the another data of the specific application from the service server through the second connection.

19. The multilayer network connection communication method of claim 18, wherein the step of transmitting, by the smart terminal device, the data sent by the specific application to the service server through the second layer network comprises:

adding, by the smart terminal device, a regional service information to the data sent by the specific application; and transmitting, by the smart terminal device, the data sent by the third application together with the regional service information to the service server through the second layer network.

20. The multilayer network connection communication method of claim 18, further comprising:

performing, by the smart terminal device, an authentication procedure or a payment procedure according to an identification code of the mobile device.

21. The multilayer network connection communication method of claim 18, further comprising:

checking, by the mobile device, whether a pending data is stored, after the specific application is executed.

22. The multilayer network connection communication method of claim 21, further comprising:

encrypting, by the mobile device, the pending data to generate the data if the pending data is stored.

23. The multilayer network connection communication method of claim 18, further comprising:

after the data sent by the specific application is transmitted to the service server through the smart terminal device, updating a status according to the data and sending a status update information to the smart terminal device, by the service server; and transmitting, by the smart terminal device, the status update information to the mobile device.

24. The multilayer network connection communication method of claim 22, further comprising:

after the data sent by the specific application is transmitted to the service server through the smart terminal device, decrypting the data, updating a status according to the data being decrypted, and sending a status update information to the smart terminal device, by the service server; and transmitting, by the smart terminal device, the status update information to the mobile device.

25. The multilayer network connection communication method of claim 18, further comprising:

after the specific application is executed, entering, by the mobile device, a user account and a user password corresponding to the specific application, wherein the data includes the user account and the user password; and executing, by the service server, an account verification procedure according to the user account and the user password in the data.

26. The multilayer network connection communication method of claim 18, wherein the step of establishing the first connection between the mobile device and the smart terminal device through the first layer network comprises:

establishing a near field communication connection between the mobile device and the smart terminal device through the first layer network.

27. The multilayer network connection communication method of claim 18, wherein the step of establishing the second connection between the smart terminal device and the service server through the second layer network comprises:

establishing a wireless network connection or a wired network connection between the smart terminal device and the service server through the second layer network.

28. A multilayer network connection communication method, comprising:

detecting, by a smart terminal device, a mobile device through a first layer network;

establishing, by the smart terminal device, a first connection with the mobile device through the first layer network with a technique of Wi-Fi Direct and receiving at least one inquiry message from the mobile device through the first connection, wherein the at least one inquiry message inquires whether at least one first application is supported, wherein the mobile device bidirectionally communicates with the smart terminal device through the first connection;

checking, by the smart terminal device, whether the at least one first application is supported according to the at least one inquiry message;

sending, by the smart terminal device, at least one startup message directly to the mobile device through the first connection without using a service server to request the mobile device to execute at least one second application which is supported among the at least one first application by both of the smart terminal device and the mobile device, wherein the at least one second application includes a specific application, wherein the specific application of the mobile device is executed to respond to the at least one startup message;

after the step of sending the at least one startup message directly to the mobile device through the first connection without using the service server, receiving, by the smart terminal device, data of the specific application of the mobile device from the mobile device through the first layer network;

establishing, by the smart terminal device, a second connection through a second layer network, and after the step of receiving the data of the specific application of the mobile device from the mobile device through the first layer network, transmitting, by the smart terminal device, the data of the specific application received from the mobile device through the first connection to the service server through the second layer network, wherein the service server is an application server providing an environment for executing the specific application, wherein the specific application at least comprises at least one of a social network application and an Email application; and forwarding, by the smart terminal device, another data of the specific application directly to the mobile device through the first connection without using the service server only if the smart terminal device receives the another data of the specific application from the service server through the second connection, wherein the mobile device accesses the service server through the smart terminal device, exchanging the data of the specific application with the service server through the smart terminal device.

29. The multilayer network connection communication method of claim 28, wherein the step of transmitting the data sent by the specific application to the service server through the second layer network comprises:

adding a regional service information to the data sent by the specific application; and transmitting the data sent by the specific application together with the regional service information to the service server through the second layer network.

30. The multilayer network connection communication method of claim 28, further comprising:

performing an authentication procedure or a payment procedure according to an identification code of the mobile device.

31. The multilayer network connection communication method of claim 28, further comprising:

receiving a status update information from the service server and transmitting the status update information to the mobile device, after the data sent by the specific application is transmitted to the service server.

32. The multilayer network connection communication method of claim 28, further comprising:

receiving an offline message from the mobile device; and suspending the first connection established by the mobile device in response to the offline message.

33. The multilayer network connection communication method of claim 28, wherein the step of establishing the first connection with the mobile device through the first layer network comprises:

establishing a near field communication connection with the mobile device through the first layer network.

34. The multilayer network connection communication method of claim 28, wherein the step of establishing the second connection through the second layer network, comprises:

establishing a wireless network connection or a wired network connection through the second layer network.

\* \* \* \* \*